US012567217B2

(12) United States Patent
Wu et al.

(10) Patent No.: US 12,567,217 B2
(45) Date of Patent: Mar. 3, 2026

(54) SMART CONTENT RENDERING ON AUGMENTED REALITY SYSTEMS, METHODS, AND DEVICES

(71) Applicant: META PLATFORMS, INC., Menlo Park, CA (US)

(72) Inventors: Shengzhi Wu, Belmont, CA (US); Alexander Faaborg, Mountain View, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 74 days.

(21) Appl. No.: 18/513,160

(22) Filed: Nov. 17, 2023

(65) Prior Publication Data

US 2024/0185542 A1     Jun. 6, 2024

Related U.S. Application Data

(60) Provisional application No. 63/386,119, filed on Dec. 5, 2022.

(51) Int. Cl.
*G06T 19/00*       (2011.01)
*G06F 3/01*       (2006.01)
           (Continued)

(52) U.S. Cl.
CPC ............ *G06T 19/006* (2013.01); *G06F 3/013* (2013.01); *G06T 3/40* (2013.01); *G06V 10/25* (2022.01);
           (Continued)

(58) Field of Classification Search
CPC ...... G06T 19/006; G06V 10/25; G06V 40/20; G06F 3/013
           (Continued)

(56) References Cited

U.S. PATENT DOCUMENTS 9,323,325 B2   4/2016   Perez et al.
11,054,902 B2   7/2021   Border
           (Continued)

FOREIGN PATENT DOCUMENTS

WO      2012007764 A1     1/2012

OTHER PUBLICATIONS

Ahn S., et al., "Adaptive Fog-Based Output Security for Augmented Reality," Proceedings of the Morning Workshop on Virtual Reality and Augmented Reality Network, Aug. 2018, 6 pages.
           (Continued)

*Primary Examiner* — Thomas J Lett

(74) *Attorney, Agent, or Firm* — Morgan, Lewis & Bockius LLP

(57)            ABSTRACT

A system and method for providing contextually-based content displays are provided. The system may include a device having a display providing content in a viewable region of the display. The device may include a camera device configured to track a scene of a real-world environment captured in a field of view of the camera device. The device may determine a region of interest in the scene. The device may perform object recognition on the scene tracked by the camera device. The device may determine an environmental interaction based on the object recognition and the region of interest. The device may adaptively alter, based on the environmental interaction, a position of the content provided by the display.

19 Claims, 9 Drawing Sheets

(51) Int. Cl.
    *G06T 3/40*          (2006.01)
    *G06V 10/25*       (2022.01)
    *G06V 40/20*       (2022.01)

(52) U.S. Cl.
    CPC .......... *G06V 40/20* (2022.01); *G06V 2201/07*
                                   (2022.01)

(58) Field of Classification Search
    USPC .......................................................... 345/633
    See application file for complete search history.

(56)              References Cited

U.S. PATENT DOCUMENTS 11,249,315 B2     2/2022   Huang et al.
11,461,986 B2 *  10/2022  Tartz .................... G06T 19/006

2012/0154557 A1    6/2012  Perez et al.
2019/0324274 A1  10/2019  Kalinowski et al.
2020/0201514 A1    6/2020  Murphy et al.
2021/0398336 A1 * 12/2021  Jin ......................... G06N 3/049
2022/0100265 A1    3/2022  Kies et al.
2022/0237878 A1    7/2022  Tartz et al.

OTHER PUBLICATIONS

International Search Report and Written Opinion for International Application No. PCT/US2023/082283, mailed Feb. 27, 2024, 12 pages.
International Preliminary Report on Patentability for International Application No. PCT/US2023/082283, mailed Jun. 19, 2025, 9 pages.

\* cited by examiner

Inner View
210

Outer View
220

Associate a second region of interest with the environmental interaction
510

Associate a third region of interest with the content
520

Continuously move the position of the content to reduce interference between the second region of interest associated with the environmental interaction and the third region of interest associated with the content
530

600

Computer 608

604

Head-mounted Display 610

Audio Device 606

Front Camera 616

Rear Camera 618

Frame 612

Display 614

Display 614

900

SMART CONTENT RENDERING ON AUGMENTED REALITY SYSTEMS, METHODS, AND DEVICES

CROSS-REFERENCE TO RELATED APPLICATIONS

This application claims the benefit of U.S. Provisional Application No. 63/386,119 filed Dec. 5, 2022, the entire content of which is incorporated herein by reference.

TECHNOLOGICAL FIELD

Examples of this disclosure may relate generally to methods, apparatuses and computer program products for providing contextual analyses and intelligent content rendering on augmented reality systems.

BACKGROUND

Augmented reality is a form of reality that has been adjusted in some manner before presentation to a user, which can include, e.g., a virtual reality (VR), an augmented reality (AR), a mixed reality (MR), a hybrid reality, or some combination and/or derivatives thereof. AR, VR, MR, and hybrid reality devices often provide content through visual means, such as through a headset, e.g., glasses.

Many augmented reality devices utilize cameras to present information to render additive information and/or content on top of the physical world, and may execute various AR operations and simulations. For example, an augmented reality device may display a hologram overlaid on top of a screen or display.

However, the real and augmented content may interfere with each other and/or make it difficult for a user to focus on the content of interest. For example, overlaid hologram content may cover a view on a cell phone screen or a wearable display, resulting in a diminished user experience. In another example, a user may attempt to read a book, watch television, talk to people, or otherwise view or interact with one or more objects in the physical world, but AR content may distract and interfere with the real world interactions. Such distractions may be problematic and may disconnect people from their real world surroundings. Accordingly, there exists a need to assist in distinguishing when an AR user intends to interact with the physical world or the virtual world, and incorporating context, such as determining when interactions (e.g., physical versus virtual) may be appropriate or desired.

BRIEF SUMMARY

In meeting the described challenges, the present disclosure provides systems and methods for operating augmented reality devices.

In one example of the present disclosure, a method is provided. The method may include performing object recognition on a scene of a real-world environment captured in a field of view of a camera device; determining a region of interest in the scene; determining an environmental interaction based on the object recognition and the region of interest; and adaptively altering, based on the environmental interaction, a position of content provided by a display.

In another example of the present disclosure, a system is provided. The system may include one or more processors and a memory including computer program code instructions. The system may also include computer-readable medium storing instructions that, when executed, cause: performing object recognition on a scene tracked by a camera device, determining a region of interest in the scene, determining an environmental interaction based on the object recognition and the region of interest, and adaptively altering, based on the environmental interaction, a position of content provided on a display.

In another example of the present disclosure, a device is provided. The device may include a display providing content in a viewable region of the display, a camera device configured to track a scene of a real-world environment captured in a field of view of the camera device, one or more processors and a non-transitory memory including computer-executable instructions, which when executed, cause the device to at least: determine a region of interest in the scene, perform object recognition on the scene tracked by the camera device, determine an environmental interaction based on the object recognition and the region of interest, and adaptively alter, based on the environmental interaction, a position of the content provided by the display.

For instance, examples may utilize a camera device configured to track a scene, a display providing content in a viewable region of the display, a processor, and a non-transitory memory including computer-executable instructions, which when executed, cause the processor to at least: identify a region of interest corresponding to the gaze, perform object recognition on the scene tracked by the camera device, determine an environmental interaction based on the object recognition and the region of interest, and adaptively alter a position of the content provided on the display based on the environmental interaction. Some examples may include a gaze-tracking camera device configured to track a gaze.

In various examples of the present disclosure, the environmental interaction may include at least one of an approaching object or an approaching person, a departing object or departing person, an interaction(s) with one or more objects, an interaction with one or more persons, or a gesture(s). The computer-executable instructions may further determine, based on the gaze, a transition of the region of interest from the display to the scene, or a transition of the region of interest from the scene to the display, minimize or reduce a size of the content in an instance in which the region of interest transitions from the display to the scene, and maximize or increase a size of the content in an instance in which the region of interest transitions from the scene to the display. In other examples, the position of content on the display may be moved, reduced, and/or minimized in an instance in which an object of interest approaches at a predetermined threshold speed.

In some examples of the present disclosure, camera device(s) and the display may be mounted on an augmented reality device, for example, a head-mounted device. In various examples of the present disclosure, the augmented reality device may further comprise glasses (e.g., smart glasses), a headset, a display, a microphone, a speaker, and any of a combination of peripherals, and computing systems. At least one camera device may comprise a left eye tracking camera and a right eye tracking camera. At least camera device may also comprise at least one outward-facing camera to track a scene captured in a field of view of the camera device. The display may provide holographic content, and in some examples, the field of view may correspond to the gaze of at least one eye of a user captured by a camera device. In some examples determining the region of interest may be associated with determining a gaze and/or a gaze direction of at least one eye.

Examples of the present disclosure may include one or more machine learning modules and techniques to determine environmental interactions. Training data may include associations between a tracked gaze and a scene. The position of the content may be adaptively altered using a machine learning algorithm. Object recognition may also be performed continuously, in real-time. Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The summary, as well as the following detailed description, is further understood when read in conjunction with the appended drawings. For the purpose of illustrating the disclosed subject matter, there are shown in the drawings examples of the present disclosure; however, the disclosed subject matter is not limited to the specific methods, compositions, and devices disclosed. In addition, the drawings are not necessarily drawn to scale. In the drawings.

Figure 1:
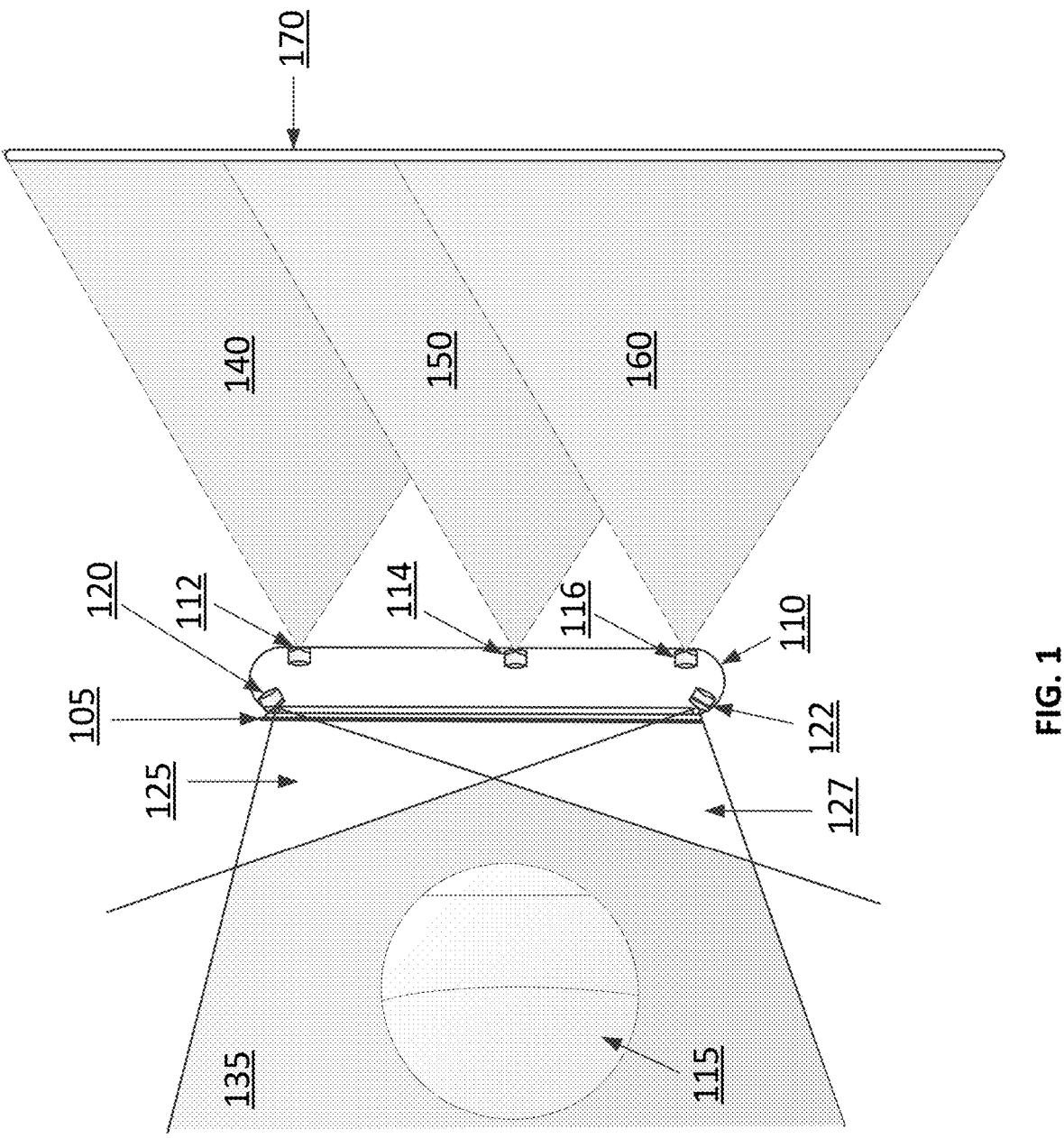
FIG. 1 illustrates a side view of an augmented reality system in accordance with examples of the present disclosure.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein. Like reference numerals refer to like elements throughout. As used herein, the terms "data," "content," "information" and similar terms may be used interchangeably to refer to data capable of being transmitted, received and/or stored in accordance with embodiments of the invention. Moreover, the term "exemplary", as used herein, is not provided to convey any qualitative assessment, but instead merely to convey an illustration of an example. Thus, use of any such terms should not be taken to limit the spirit and scope of embodiments of the invention.

Also, as used in the specification including the appended claims, the singular forms "a," "an," and "the" include the plural, and reference to a particular numerical value includes at least that particular value, unless the context clearly dictates otherwise. The term "plurality", as used herein, means more than one. When a range of values is expressed, another example includes from the one particular value and/or to the other particular value. Similarly, when values are expressed as approximations, by use of the antecedent "about," it will be understood that the particular value forms another example. All ranges are inclusive and combinable. It is to be understood that the terminology used herein is for the purpose of describing particular aspects only and is not intended to be limiting.

As defined herein a "computer-readable storage medium," which refers to a non-transitory, physical or tangible storage medium (e.g., volatile or non-volatile memory device), may be differentiated from a "computer-readable transmission medium," which refers to an electromagnetic signal.

As referred to herein, holographic content may denote two or three dimensional virtual objects and/or interactive applications.

As referred to herein, a Metaverse may denote an immersive virtual space or world in which devices may be utilized in a network in which there may, but need not, be one or more social connections among users in the network or with an environment in the virtual space or world. A Metaverse or Metaverse network may be associated with three-dimensional (3D) virtual worlds, online games (e.g., video games), one or more content items such as, for example, images, videos, non-fungible tokens (NFTs) and in which the content items may, for example, be purchased with digital currencies (e.g., cryptocurrencies) and other suitable currencies. In some examples, a Metaverse or Metaverse network may enable the generation and provision of immersive virtual spaces in which remote users may socialize, collaborate, learn, shop and/or engage in various other activities within the virtual spaces, including through the use of Augmented/Virtual/Mixed Reality.

It is to be appreciated that certain features of the disclosed subject matter which are, for clarity, described herein in the context of separate examples, can also be provided in combination in a single embodiment. Conversely, various features of the disclosed subject matter that are, for brevity, described in the context of a single example embodiment, can also be provided separately or in any sub-combination. Further, any reference to values stated in ranges includes each and every value within that range. Any documents cited herein are incorporated herein by reference in their entireties for any and all purposes.

In various aspects, systems and methods may enable contextual analyses and understanding to enhance user experience and interactions with AR technologies. Examples may combine gaze tracking technologies with a tracked scene to identify at least one region of interest, determine an environmental interaction, and adaptively alter a position of content on a display, based on the environmental interaction.

Examples may utilize gaze tracking and object recognition techniques to detect whether a user is looking at and/or trying to interact with an object(s) in the physical world, such as, for example, a phone, book, or newspaper. In an instance in which such viewing and/or interaction with the physical world is determined, content on a display associated with an AR device (such as AR glasses or other head-worn AR devices) may be moved, minimized, phased out, and/or adaptively adjusted to facilitate the intended user interaction with the physical world.

In various examples, aspects discussed herein may be further reinforced and applied to smart phones, gaming devices, and other handheld technology. For example, contextual analyses may determine whether a user is actively interacting with a phone, such as tapping on the screen or scrolling, and such contextual clues may result in the AR device pausing, moving and/or phasing out content that may block the user's view of the interaction with the phone. In some examples, the AR content may be moved to a different position that does not block the user's sight/view of the phone.

Accordingly, by contextually analyzing what a user is looking at and interacting with, systems, methods, and devices may intelligently determine how and when to render AR content and enable users to stay present and interact in the physical world.

FIG. 1 illustrates a side view of an example AR system in accordance with aspects discussed herein. Device 110 may be an AR device (e.g., augmented reality system 600 of FIG. 6), such as AR glasses or other head-worn AR device. The device 110 may be configured to utilize virtual reality, augmented reality, mixed reality, a hybrid reality, Metaverse reality or some combination thereof. The device 110 may include a display on which a user may view content. The content may include holographic content, a display of the physical world (e.g., a real-world environment), or a combination of both.

In some examples, the AR device 110 may include one or more camera devices 112, 114, 116, 120, 122. An eye-tracking camera device, including one or more of camera(s) 120, 122 may include at least one camera tracking an eye 115 to capture a user's gaze. A scene-tracking camera device 112, 114, 116 may include at least one camera tracking a scene 170 in the physical world. One or more cameras in the eye-tracking camera device 120, 122 may be directed inward, whereas one or more cameras in the scene-tracking camera device 112, 114, 116 may be directed outward to capture the scene.

As illustrated in FIG. 1, individual cameras 112, 114, 116, 120, 122, may capture different fields of view. For example, in the outward-facing scene-tracking camera device 112, 114, 116, each camera(s) 112, 114, 116 may captures its own respective field of view 140, 150, 160 of the scene in the physical world. The fields of view 140, 150, 160, may be combined to form the captured scene 170. In some examples, the captured scene may be displayed on the display 105, to allow the user to see the physical world.

The inward-facing eye-tracking camera device similarly includes cameras 120, 122 having respective fields of view 125, 127 and an overlapping field of view 135, which includes eye 115. The respective fields of view 125, 127 may capture images of one or both eyes of a user and track eye movements to determine and track a gaze of an eye(s). Each of the cameras 120, 122 respective field of view 125, 127 may provide information, which may be combined to assess eye movements and track the gaze of an eye(s) more accurately.

Gaze tracking may analyze various positions and characteristics of one or both eyes to determine, for example, that a user is focusing in a certain direction and/or at a certain depth, e.g., a gaze direction and/or a gaze depth. According to an aspect, at least one machine learning module may be applied/implemented to analyze eye movement patterns and determine a gaze associated with a behavior. For example, a gaze comprising repeated left and right eye movements may indicate that the user is reading. A prolonged stare at a certain position may indicate that a user is looking at an object. Eye movements and characteristics, such as pupil size, may indicate whether a user is looking at something near or far. A decrease in pupil size may indicate that the eye(s) is focusing on an object or region that is near, whereas an increase in pupil size may indicate that the eye(s) is focusing on an object or region that is farther away.

In various examples, the eye-tracking camera device, including camera(s) 120, 122, and scene-tracking camera device, including camera(s) 112, 114, 116 may apply a variety of configurations and arrangements of an individual camera(s). The eye-tracking camera device, including camera(s) 120, 122 may contain one or more cameras 112, 114, 116, 120, 122, mounted on the AR device 110. Camera(s) of the eye-tracking camera device 120, 122 may capture one or both eyes of a user. For example, separate, respective cameras 112, 114, 116, 120, 122 may be positioned to focus on the left eye or the right eye, e.g., a left eye tracking camera and a right eye tracking camera. Some cameras may capture both eyes, while other cameras may capture a single eye. The scene-tracking camera device, including camera(s) 112, 114, 116, may include one or more outward facing cameras 112, 114, 116 to track the scene 170. The tracked scene may correspond to the gaze of an eye(s). In some examples, the gaze of the eye(s) may correspond to a region of the scene (e.g., in a physical world), and vice versa.

In some AR devices 110, the display 105 may be transparent, thus allowing the eye 115 to directly sec/view the scene and any holographic content that may be provided on the display 105. As discussed herein, an AR glasses device (e.g., AR device 110) may allow a user to view the physical world (e.g., a real world environment), while AR content may be overlaid via display 105. In other examples, the display 105 and AR device 110 may not be transparent, and the scene may be reproduced on the display 105 based on the regions of the field of views 140, 150, 160, captured by the scene-tracking camera device's camera(s) 112, 114, 116. In such examples, the regions associated with field of views 140, 150, 160 may be combined using one or more computing devices and/or processors to reproduce scene 170 and render the content on the display 105. Holographic content and/or other AR content may also be provided on the display 105 as discussed herein.

Figure 2:
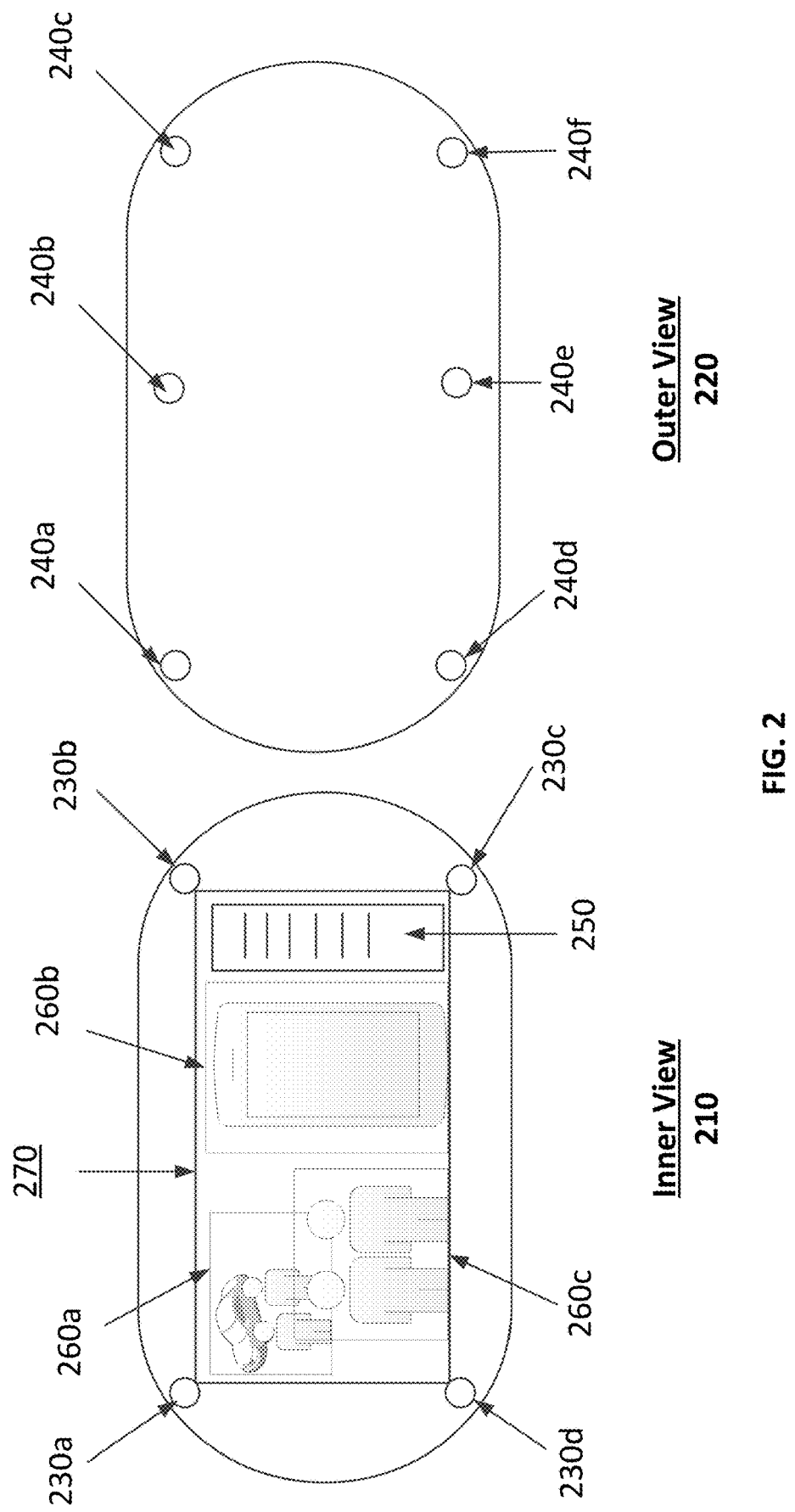
FIG. 2 illustrates inner and outer views of an augmented reality system in accordance with examples of the present disclosure.

FIG. 2 illustrates an inner view 210 and an outer view 220 of an augmented reality system in accordance with examples discussed herein. As discussed herein, an AR device (e.g., AR device 110) may be a head-worn device. Inner view 210 may corresponds to the side (e.g., the inner side) of the AR device that a user directly sees when wearing or using the AR device. The opposite side of the inner view 210 may correspond to the outer view 220 of the AR device.

The inner side 210 may include a display 270 and a camera device comprising one or more cameras 230a, 230b, 230c, 230d (also referred to herein as cameras 230a-d). In some examples, cameras may be positioned along an edge of the display 270. Cameras (e.g., cameras 230a-d) may capture movements of one or both eyes, and captured images from cameras 230a-d may be usable to track the gaze of an eye(s), including at least one of a gaze depth and/or a gaze direction of an eye(s). In an example, cameras 230a and 230d may track a user's left eye, while cameras 230b, 230c may track a user's right eye.

The display 270 may provide content corresponding to the real world content 260a, 260b, 260c (also referred to herein as real world content 260a-d) and AR content 250 such as, for example, holographic content. As discussed herein, real world content 260a-d may be a rendering of content captured from one or more of outward-facing cameras 240a, 240b, 240c, 240d, 240c, 240f (also referred to herein as outward facing cameras 240a-f). In other examples, real world content (e.g., real world content 260a-c) may be viewable through a transparent display, and/or through a lens, similar to a user viewing the real world through glasses.

The outer view 220 of the augmented reality system illustrates positioning of one or more outward facing cameras 240a, 240b, 240c, 240d, 240c, 240f (also referred to herein as outward facing cameras 240a-f). The cameras 240a-f may be positioned, for example, along an edge of the outward facing side of the AR device. Camera positioning may be varied to capture differing field of views. Cameras may be embedded in the AR device (e.g., AR device 110), to reduce or minimize visibility of each camera on the AR device. Cameras (e.g., cameras 240a-f) may also be colored and/or positioned to blend in with the outer face of the AR device.

The outward facing cameras 240a-f may be usable to track a scene in the real, physical world, and optionally provide information for a rendering of the scene on display 270. Information from outward facing cameras 240a-f may be combined with information from inward facing eye tracking cameras 230a-d to provide contextual analysis and adaptively adjust positioning of AR content 250 on the display 270.

As discussed herein, object recognition techniques may be applied to the tracked scene. The object recognition techniques may assist in determining environmental events and interactions, which may be indicative of what a user is focusing on and/or interacting with. The depicted display 270 may illustrate several example regions of interest containing one or more objects, which may be indicative of an environmental interaction when combined with eye tracking. Regions of interest 260a, 260b, 260c (also referred to herein as regions of interest 260a-c or regions 260a-c), may initially be identifiable based on the tracked gaze of an eye(s). For example, based on a gaze direction and/or a gaze depth of an eye(s), it may be inferred/determined by the AR device that a user is looking at a distant area such as region 260a or a closer area, such as regions 260b, 260c. Object recognition techniques applied to a tracked scene, by the AR device, may identify various objects within the scene, which may be objects of interest. For example, for purposes of illustration and not of limitation, object recognition techniques may identify an object(s), such as a car or a cell phone, or individuals.

Characteristics of objects may be indicative of a particular environmental action that the user is or may be engaging in. For example, eye tracking cameras 230a-d may identify that the user is looking generally at region 260b. Object recognition performed on the scene, by the AR device, may indicate an object indicative of cell phone within the region 260b. The cell phone's characteristics, such as its size (e.g., a larger size relative to sizes of other objects in this example) relative to distant objects, e.g., car and people in region 260a, or tracked eye movements, e.g., indicative of looking at a near object, reading, scrolling, and/or the like, may indicate that the user is likely interacting with a cell phone in region 260b. Accordingly, AR content 250 may be positioned, by the AR device, such that it does not overlap with region 260b and/or the object(s) with which the user is interacting.

In another example, tracked eye movements may indicate that a user is looking in the general area of regions 260a and 260c. A prolonged, distant gaze, by an eye(s), at region 260a may indicate that the user is watching the people in the region 260a. Accordingly, content 250 can be positioned so it does not overlap with region 260a.

In another example, the tracked eye movements may then indicate that the user shifts their gaze (e.g., of an eye(s)) to region 260c. The positioning of AR content 250 may then be updated, by the AR device, such it does not overlap with region 260c. In some instances, it may be unclear from the tracked gaze of an eye(s) whether the user is looking at region 260a or 260c. In this scenario, object recognition may further assist the determination, of the AR device, by identifying characteristics of objects and associating those characteristics with a potential environmental interaction within a region of interest. The people in region 260c may be increasing in size, thus indicating that the object is approaching. As the scene is tracked, a waving hand may be identified in the scene. In some examples, a gesture may be indicative of a particular environmental interaction. The combination of the waving hand and the approaching individuals may indicate, to the AR device, that the user is focusing on region 260c and intends to engage with the individuals identified in the region 260c. As such, the AR content 250 may remain away from region 260c.

In an example where the individuals in region 260c become smaller, this may enable the AR device to determine that the individuals are departing or walking away from the user. Such environmental interaction, utilized by the AR device, may indicate that the objects within the region 260c are no longer of interest, and therefore, the AR content 250 may optionally be positioned over the region 260c.

In yet another example, the tracked eye movements may enable the AR device to determine that the user is looking at AR content 250. In this example, the AR content 250 may optionally be enlarged, moved, and/or maximized, by the AR device, to enhance the viewing experience of the AR content 250.

In some examples, although the user may be focusing on AR content 250, one or more environmental interactions and events may cause the content AR 250 to be shifted, minimized, or otherwise moved. Object recognition and scene tracking techniques, utilized/implemented by the AR device, may indicate that the individuals in region 260c are approaching. Approaching individuals may indicate a potential interaction with the user (e.g., of the AR device). In such a case, the AR content 250 may not be blocking or generally interfering with any user interaction within that region of interest (e.g., region 260c).

Accordingly, approaching objects and departing objects may be an environmental interaction that causes the AR content 250 to shift, so that the user may be aware of the approaching object, or in this case, a potential interaction with the individuals in region 260c. Likewise, an interaction with an object or person or a gesture, such as pointing, a wave, an embrace, etc., may be indicative of an environmental interaction, and may cause an adaptive repositioning of the AR content 250, by the AR device, so that the AR content 250 does not overlap with interactions with any objects of interest.

Figure 3:
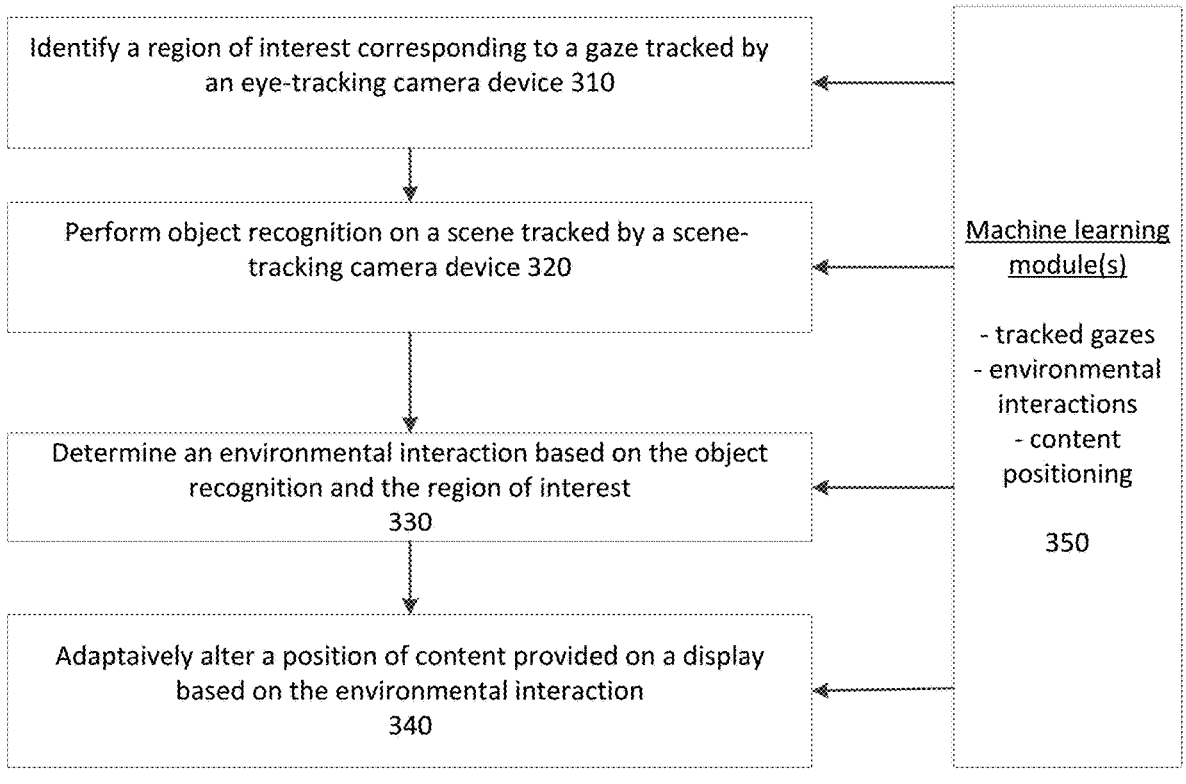
FIG. 3 illustrates a flowchart for performing contextual analyses in accordance with examples of the present disclosure.

FIG. 3 illustrates a flowchart for performing contextual analyses in accordance with examples discussed herein. At block 310, a device (e.g., AR device 110) may identify a region of interest corresponding to a gaze (e.g., of an eye) tracked by an eye-tracking camera device. As discussed herein, such eye-tracking camera devices (e.g., eye-tracking camera device 120, 122) may include one or more inward facing cameras configured to capture movements of one or both eyes of a user.

At block 320, a device (e.g., AR device 110) may perform object recognition on a scene (e.g., scene 170) tracked by a scene-tracking camera device. As discussed herein, such scene-tracking camera devices (e.g., scene-tracking camera device, e.g., including camera(s) 112, 114, 116) may include one or more outward facing cameras configured to capture a scene from the physical world (e.g., real world environment). Object recognition techniques may identify an object(s) or a person(s), such as an object or person with whom the user is interacting. Example objects that may be identifiable may include a phone, a book, a newspaper, or other device/item.

At block 330, a device (e.g., AR device 110) may determine an environmental interaction based on the object recognition and the region of interest. As discussed herein, the environmental interaction may include, for example, at least one of an approaching object(s) or person(s), a departing object(s) or person(s), an interaction with an object(s) or person(s), a gesture(s), etc. The environmental interaction may further indicate a likely interaction between the user and an object(s) or person(s).

At block 340, a device (e.g., AR device 110) may adaptively alter a position of the content (e.g., AR content 250) provided on the display (e.g., display 105, display 270) based on the environmental interaction. Certain types of environmental interactions may cause the positioning of the content to be altered. For example, a quickly approaching person or object may indicate that something is approaching of which the user may want to be aware. In some examples, an approaching object, e.g., a curb on a sidewalk, may represent a danger or object that the user may wish to see. Similarly, an approaching individual, an individual standing near the user, or an individual otherwise appearing to engage with or interact with the user may be an environmental interaction with which the user may also wish to engage. As such, content (e.g., AR content) may be adaptively altered, by the device (e.g., AR device 110), so that it does not overlap with the object or individual. In some cases, the content positioning may be altered so it does not overlap with, impede, block, or otherwise distract the user from engaging the object or person.

In various examples, adaptive content positioning may be adjusted based on user preferences. In other examples, positioning may be adjusted using a machine learning module to identify certain object interactions and/or associated gazes and/or interactions by the user.

In some examples, as noted in block 350, one or more machine learning modules may assist with any of the operations associated with blocks 310, 320, 330, 340. For example, a machine learning module may assist in associating tracked eye movements with gazes of an eye(s). Other modules may assist with adaptively learning directionality related to tracked gazes of an eye(s) and/or associating the tracked gazes with information obtained about the scene (e.g., scene 170) from the scene-tracking camera device (e.g., scene-tracking camera device, including camera(s) 112, 114, 116). Such adaptive modules may further improve with understanding and/or rendering the scene, obtained by a plurality of cameras. In some examples, the machine learning module, other modules and adaptive modules, described above, may be implemented by a device (e.g., AR device 110).

As discussed above, environmental interactions may be determined based on previous training data associating tracked objects with a user interaction(s). Certain user behaviors, such as reading a book, newspaper, or phone, or the like may be identified based on object recognition and certain behaviors within a region of interest corresponding to the tracked gaze of an eye(s). The content positioning may further be adaptively learned, e.g., based on user preference(s), manual adjustments, and/or previous positioning.

Figure 4:
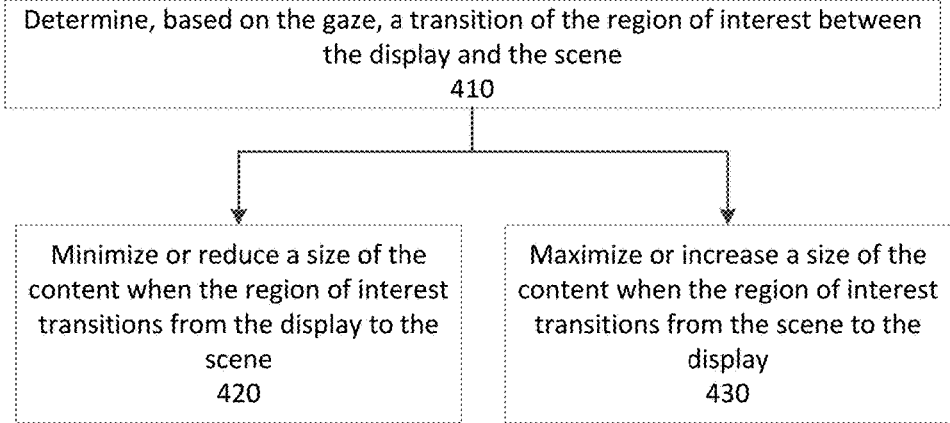
FIG. 4 illustrates a flowchart for adaptively altering content in accordance with examples of the present disclosure.

FIG. 4 illustrates a flowchart for adaptively altering content. At block 410, a device (e.g., AR device 110) may determine, based on gaze (e.g., of an eye(s)), a transition of a region of interest between a display and a scene (e.g., scene 170). As discussed herein, such transitions may be identified based on gaze direction and/or gaze depth of an eye(s). For example, a transition from the display (e.g., display 105, display 270) to the scene may be identified by gaze direction of an eye(s) in an instance in which a user looks at an area in which no content may be displayed. A gaze depth, which may be identifiable based on pupil size or other eye characteristics, may indicate that the user has transitioned from looking at something near to looking at something far. A transition from the scene to the display may be the opposite. A gaze direction may indicate that the user is looking at a region where content is displayed. A gaze depth may indicate that the user has transitioned from looking at something far to looking at something near.

At block 420, a device (e.g., AR device 110) may minimize or reduce a size of content (e.g., AR content 250) in an instance in which the region of interest transitions from the display to the scene. In other examples, the content may be phased out. In various examples, the type of transition may be manually set (e.g., by a user). The transition style may also differ based on the scene context, and what the user is looking at. For example, in an instance in which a user does a quick glance up at the scene to check the surroundings, the content may become briefly transparent (e.g., on the display). In an instance in which a user transitions from the display to the scene, and a person or object is approaching, then the content may be minimized or reduced, since the approaching object may indicate a likely interaction between the user and the object in the scene. In yet another example, the transition may cause the content to be shifted, by the device, to an area that may not interfere with the region of interest towards which the user is looking.

At block 430, a device (e.g., AR device 110) may maximize or increase a size of the content in an instance in which the region of interest transitions from the scene to the display. In other examples, the content may be phased in (e.g., by the device). Similar to the examples above, based on the type of environmental interaction, objects present in the scene, and/or the positioning of real world objects to the displayed content, may become more visible and easily viewable for the user.

Figure 5:
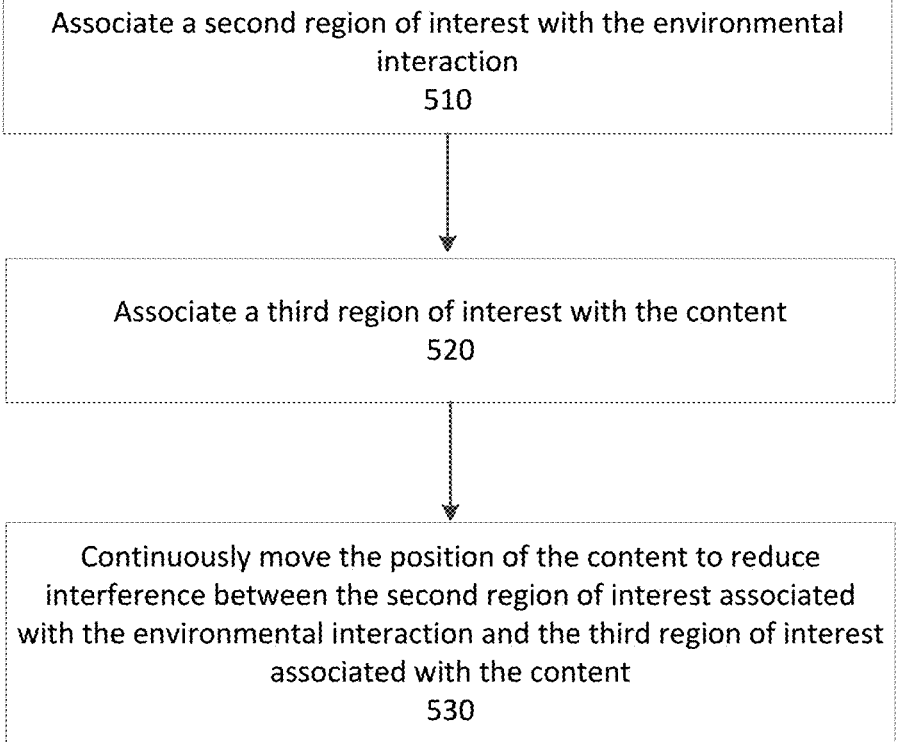
FIG. 5 illustrates another flowchart for adaptively altering content in accordance with examples of the present disclosure.

FIG. 5 illustrates another flowchart for adaptively altering content in accordance with examples of the present disclosure. At block 510, a device (e.g., AR device 110) may associate a second region of interest with an environmental interaction. The second region of interest may correspond to a region on the display (e.g., display 270, display 105). At block 520, a device (e.g., AR device 110) may associate a third region of interest with the content (e.g., AR content 250). The third region of interest may correspond to a region on the display covered by the content. The second region of interest and the third region of interest may adaptively be changed, by the device, for example, in size, based on any respective movements and/or changes to the environmental interaction and the content.

At block 520, a device (e.g., AR device 110) may continuously move the position of the content (e.g., AR content 250) to reduce interference between the third region of interest associated with the content and the second region of interest associated with the environmental interaction. Accordingly, user interaction with the environmental interaction may be improved, and less distractions, for example associated with the content, may be blocking the view (e.g., by the user).

Figure 6:
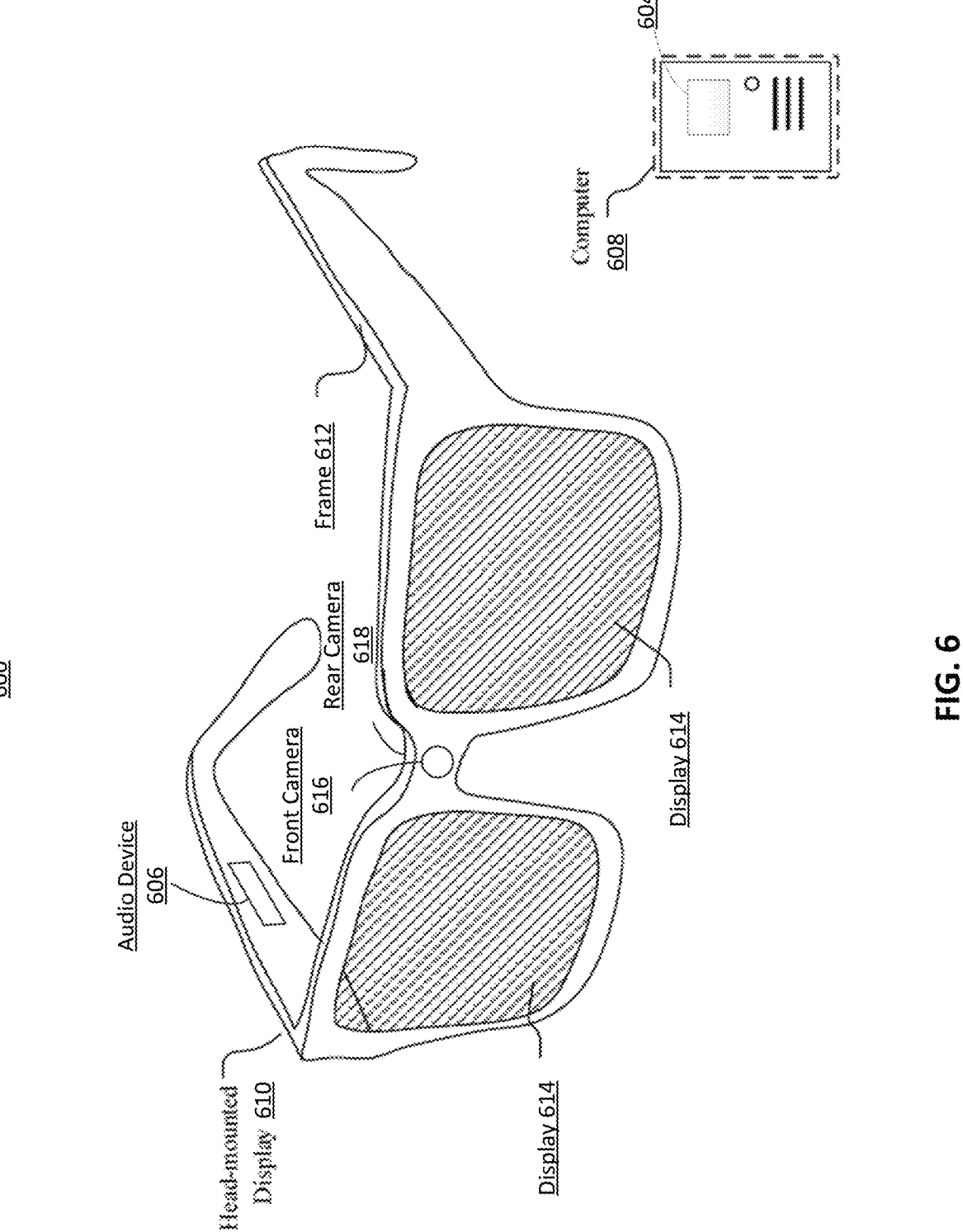
FIG. 6 illustrates an augmented reality system comprising a headset, in accordance with examples of the present disclosure.

FIG. 6 illustrates an example augmented reality system 600. The augmented reality system 600 may include a head-mounted display (HMD) 610 (e.g., smart glasses) comprising a frame 612, one or more displays 614, and a computing device 608 (also referred to herein as computer 608). The displays 614 may be transparent or translucent allowing a user wearing the HMD 610 to look through the displays 614 to see the real world (e.g., real world environment) and displaying visual augmented reality content to the user at the same time. The HMD 610 may include an audio device 606 (e.g., speakers/microphones) that may provide audio augmented reality content to users. The HMD 610 may include one or more cameras 616, 618 which may capture images and/or videos of environments. In one example, the HMD 610 may include a camera(s) 618 which may be a rear-facing camera tracking movement and/or gaze of a user's eyes.

One of the cameras 616 may be a forward-facing camera capturing images and/or videos of the environment that a user wearing the HMD 610 may view. The HMD 610 may include an eye tracking system to track the vergence movement of the user wearing the HMD 610. In one example, the camera(s) 618 may be the eye tracking system. The HMD 610 may include a microphone of the audio device 606 to capture voice input from the user. The augmented reality system 600 may further include a controller 604 comprising a trackpad and one or more buttons. The controller 604 may receive inputs from users and relay the inputs to the computing device 608. The controller may also provide haptic feedback to one or more users. The computing device 608 may be connected to the HMD 610 and the controller through cables or wireless connections. The computing device 608 may control the HMD 610 and the controller to provide the augmented reality content to and receive inputs from one or more users. In some examples, the controller 604 may be a standalone controller or integrated within the HMD 610. The computing device 608 may be a standalone host computer device, an on-board computer device integrated with the HMD 610, a mobile device, or any other hardware platform capable of providing augmented reality content to and receiving inputs from users. In some examples, HMD 610 may include an augmented reality system/virtual reality system.

Figure 7:
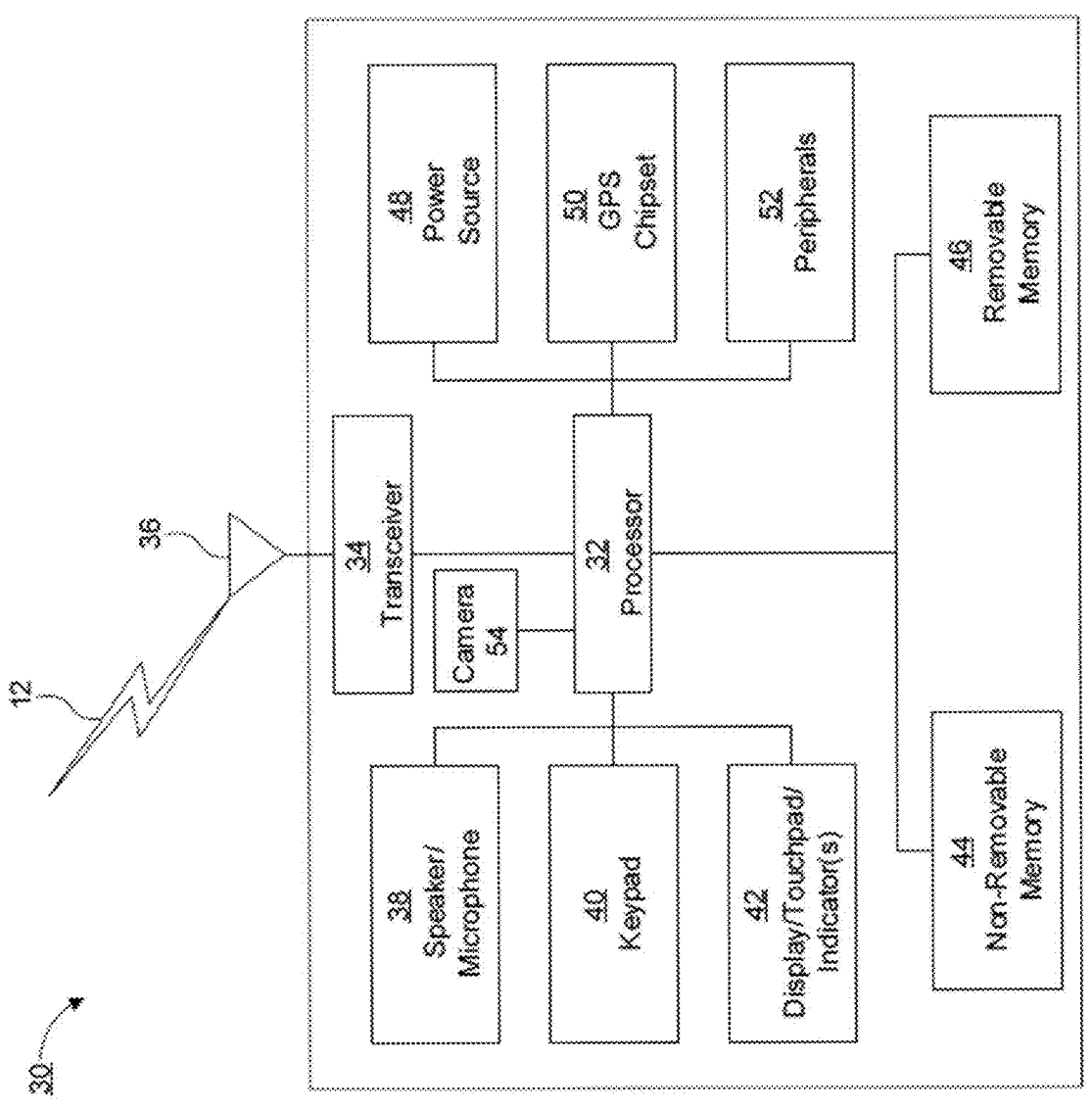
FIG. 7 illustrates a block diagram of an example device according to an example of the present disclosure.

FIG. 7 illustrates a block diagram of an exemplary hardware/software architecture of a UE 30. As shown in FIG. 7, the UE 30 (also referred to herein as node 30) can include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The UE 30 can also include a camera 54. In an example, the camera 54 is a smart camera configured to sense images appearing within one or more bounding boxes. The UE 30 can also include communication circuitry, such as a transceiver 34 and a transmit/receive element 36. It will be appreciated the UE 30 can include any sub-combination of the foregoing elements while remaining consistent with various examples discussed herein.

The processor 32 can be a special purpose processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 can execute computer-executable instructions stored in the memory (e.g., memory 44 and/or memory 46) of the node 30 in order to perform the various required functions of the node. For example, the processor 32 can perform signal coding, data processing, power control, input/output processing, and/or any other functionality that enables the node 30 to operate in a wireless or wired environment. The processor 32 can run application-layer programs (e.g., browsers) and/or radio access-layer (RAN) programs and/or other communications programs. The processor 32 can also perform security operations such as authentication, security key agreement, and/or cryptographic operations, such as at the access-layer and/or application layer for example.

The processor 32 is coupled to its communication circuitry (e.g., transceiver 34 and transmit/receive element 36). The processor 32, through the execution of computer executable instructions, can control the communication circuitry in order to cause the node 30 to communicate with other nodes via the network to which it is connected.

The transmit/receive element 36 can be configured to transmit signals to, or receive signals from, other nodes or networking equipment. For example, the transmit/receive element 36 can be an antenna configured to transmit and/or receive radio frequency (RF) signals. The transmit/receive element 36 can support various networks and air interfaces, such as wireless local area network (WLAN), wireless personal area network (WPAN), cellular, and the like. In yet another example, the transmit/receive element 36 can be configured to transmit and receive both RF and light signals. It will be appreciated that the transmit/receive element 36 can be configured to transmit and/or receive any combination of wireless or wired signals.

The transceiver 34 can be configured to modulate the signals that are to be transmitted by the transmit/receive element 36 and to demodulate the signals that are received by the transmit/receive element 36. As noted above, the node 30 can have multi-mode capabilities. Thus, the transceiver 34 can include multiple transceivers for enabling the node 30 to communicate via multiple radio access technologies (RATs), such as universal terrestrial radio access (UTRA) and Institute of Electrical and Electronics Engineers (IEEE 802.11), for example.

The processor 32 can access information from, and store data in, any type of suitable memory, such as the non-removable memory 44 and/or the removable memory 46. For example, the processor 32 can store session context in its memory, as described above. The non-removable memory 44 can include RAM, ROM, a hard disk, or any other type of memory storage device. The removable memory 46 can include a subscriber identity module (SIM) card, a memory stick, a secure digital (SD) memory card, and the like. In other examples, the processor 32 can access information from, and store data in, memory that is not physically located on the node 30, such as on a server or a home computer.

The processor 32 can receive power from the power source 48, and can be configured to distribute and/or control the power to the other components in the node 30. The power source 48 can be any suitable device for powering the node 30. For example, the power source 48 can include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 can also be coupled to the GPS chipset 50, which can be configured to provide location information (e.g., longitude and latitude) regarding the current location of the node 30. It will be appreciated that the node 30 can acquire location information by way of any suitable location-determination method while remaining consistent with an example of the present disclosure.

Figure 8:
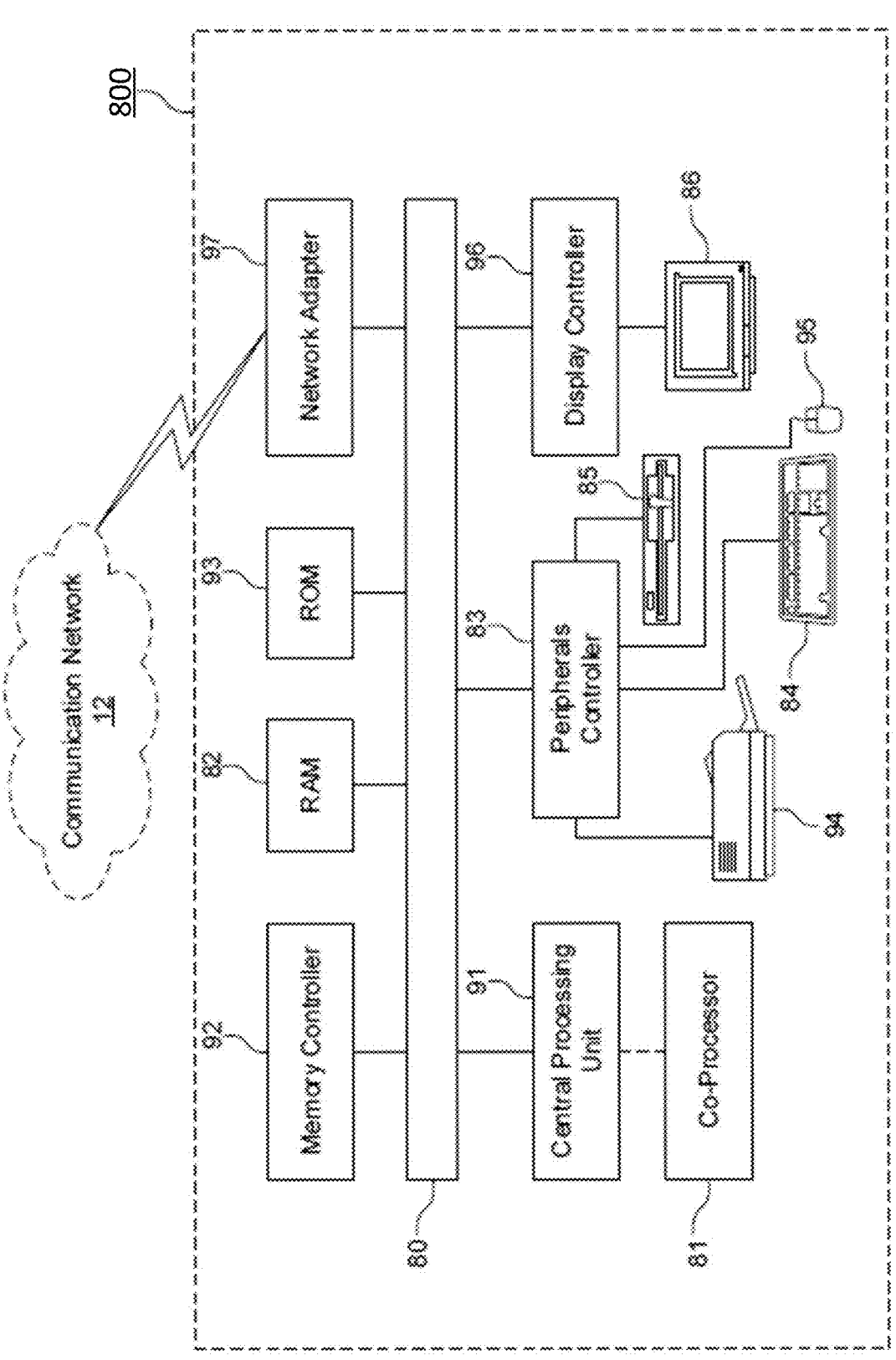
FIG. 8 illustrates a block diagram of an example computing system according to an example of the present disclosure.

FIG. 8 is a block diagram of an exemplary computing system 800 which can also be used to implement components of the system or be part of the UE 30. The computing system 800 can comprise a computer or server and can be controlled primarily by computer readable instructions, which can be in the form of software, wherever, or by whatever means such software is stored or accessed. Such computer readable instructions can be executed within a processor, such as central processing unit (CPU) 91, to cause computing system 200 to operate. In many workstations, servers, and personal computers, central processing unit 91 can be implemented by a single-chip CPU called a microprocessor. In other machines, the central processing unit 91 can comprise multiple processors. Coprocessor 81 can be an optional processor, distinct from main CPU 91, that performs additional functions or assists CPU 91.

In operation, CPU 91 fetches, decodes, and executes instructions, and transfers information to and from other resources via the computer's main data-transfer path, system bus 80. Such a system bus connects the components in computing system 200 and defines the medium for data exchange. System bus 80 typically includes data lines for sending data, address lines for sending addresses, and control lines for sending interrupts and for operating the system bus. An example of such a system bus 80 is the Peripheral Component Interconnect (PCI) bus.

Memories coupled to system bus 80 include RAM 82 and ROM 93. Such memories can include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 can be controlled by memory controller 92. Memory controller 92 can provide an address translation function that translates virtual addresses into physical addresses as instructions are executed. Memory controller 92 can also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 200 can contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 200. Such visual output can include text, graphics, animated graphics, and video. Display 86 can be implemented with a cathode-ray tube (CRT)-based video display, a liquid-crystal display (LCD)-based flat-panel display, gas plasma-based flat-panel display, or a touch-panel. Display controller 96 includes electronic components required to generate a video signal that is sent to display 86.

Further, computing system 800 can contain communication circuitry, such as for example a network adaptor 97, that can be used to connect computing system 200 to an external communications network, such as network 12 of FIG. 7, to enable the computing system 200 to communicate with other nodes (e.g., UE 30) of the network.

Figure 9:
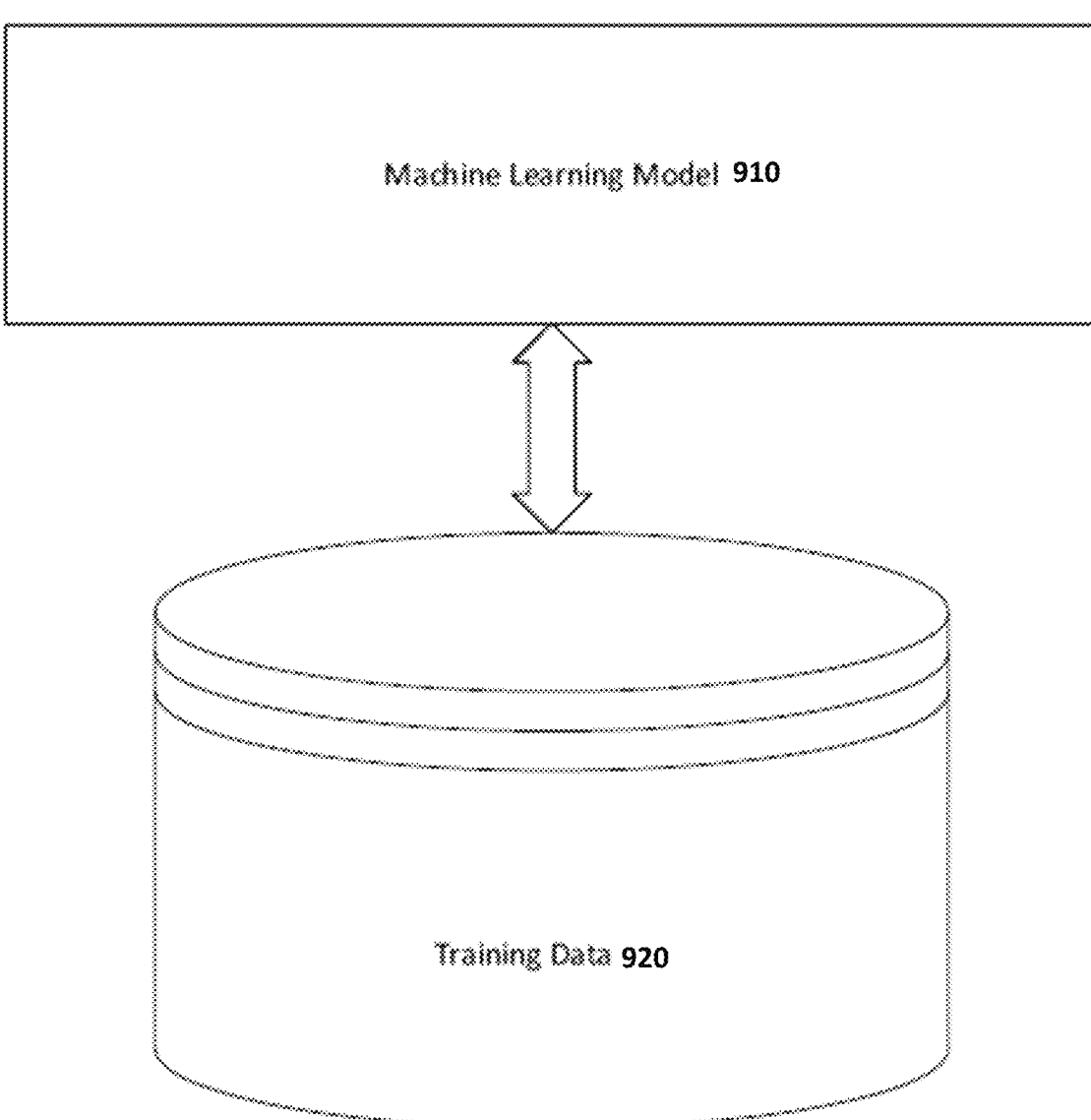
FIG. 9 illustrates a machine learning and training model in accordance with examples of the present disclosure.

FIG. 9 illustrates a framework 900 employed by a software application (e.g., algorithm) for evaluating attributes of a gesture. The framework 900 can be hosted remotely. Alternatively, the framework 900 can reside within the UE 30 shown in FIG. 7 and/or be processed by the computing system 800 shown in FIG. 8. The machine learning model 910 is operably coupled to the stored training data in a database 920. In some examples, the machine learning model 910 may be associated with operations of block 350 of FIG. 3. In some other examples, the machine learning model 910 may be associated with other operations. For instance, in some examples the machine learning model 910 may be associated with operations 310, 320, 330, 340 of FIG. 3. In other examples, the machine learning model 910 may be associated with operations 410, 420, 430 of FIG. 4 and/or operations 510, 520, 530 of FIG. 5. The machine learning model 910 may be implemented by one or more machine learning module(s) and/or another device (e.g., AR device 110).

In an example, the training data 920 may include attributes of thousands of objects. For example, the object may be a smart phone, person, book, newspaper, sign, car, and the like. Attributes may include but are not limited to the size, shape, orientation, position of the object, etc. The training data 920 employed by the machine learning model 910 may be fixed or updated periodically. Alternatively, the training data 920 may be updated in real-time based upon the evaluations performed by the machine learning model 910 in a non-training mode. This is illustrated by the double-sided arrow connecting the machine learning model 910 and stored training data 920.

In operation, the machine learning model 910 may evaluate attributes of images/videos obtained by hardware (e.g., of the AR device 110, UE 30, etc.). For example, the eye-tracking camera device 120, 122 and/or scene-tracking camera devices 112, 114, 116 of AR device 110 and/or camera 54 of the UE 30 shown in FIG. 7 may sense and capture an image/video, such as for example approaching or departing objects, object interactions, hang gestures, and/or other objects, appearing in or around a bounding box of a software application. The attributes of the captured image (e.g., captured image of an object or person may then be compared with respective attributes of stored training data 920 (e.g., prestored objects). The likelihood of similarity between each of the obtained attributes (e.g., of the captured image of an object(s)) and the stored training data 920 (e.g., prestored objects) may be given a determined confidence score. In one example, in an instance in which the confidence score exceeds a predetermined threshold, the attribute(s) may be included in an image description that may be ultimately communicated to the user via a user interface of a computing device (e.g., UE 30, computing system 800). In another example, the description may include a certain number/quantity of attributes which may exceed a predetermined threshold to share with the user. The sensitivity of sharing more or less attributes may be customized based upon the needs of the particular user.

Figure 10:
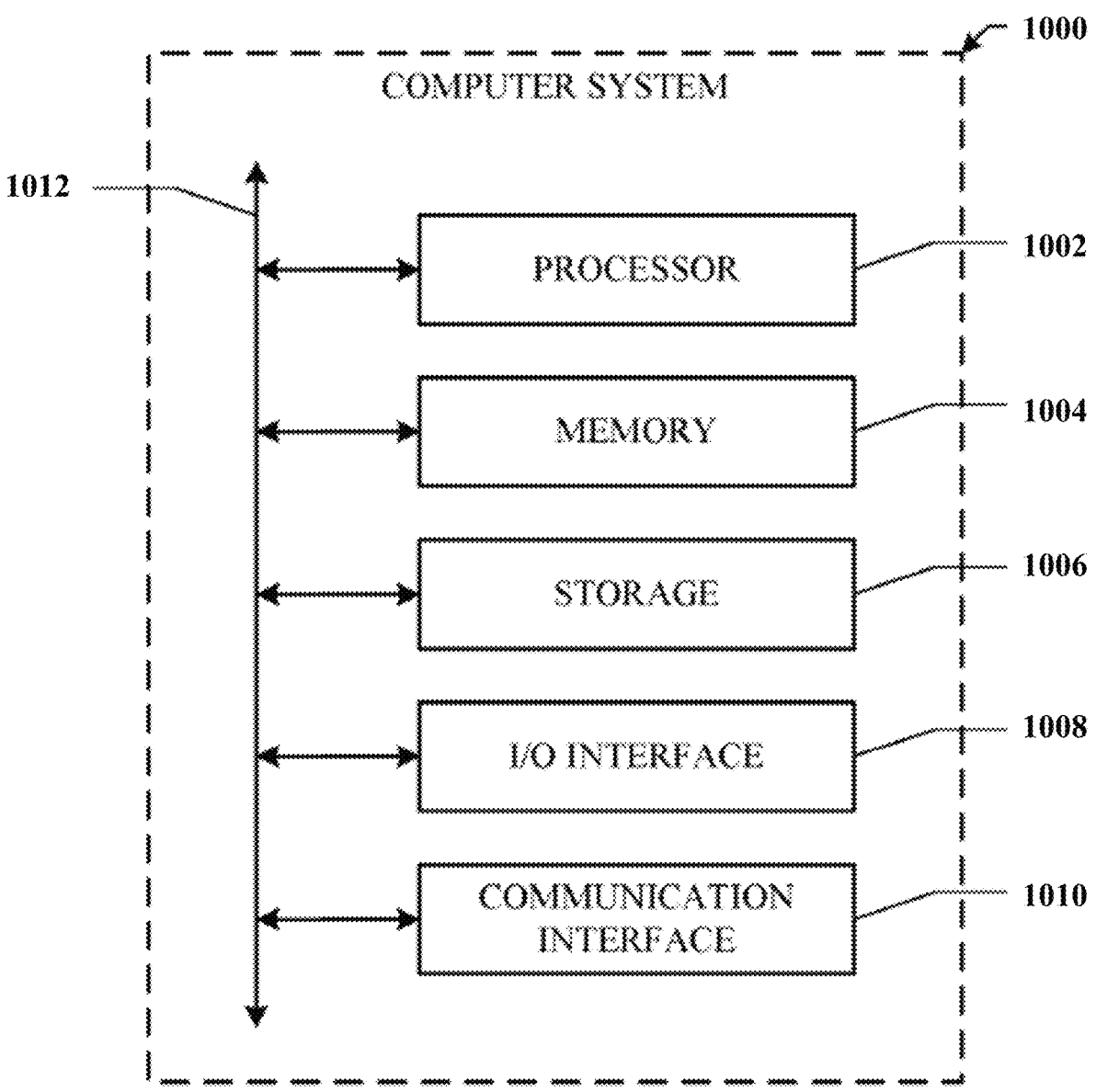
FIG. 10 illustrates a computing system in accordance with examples of the present disclosure.

FIG. 10 illustrates an example computer system 1000. In examples, one or more computer systems 1000 may perform one or more steps of one or more methods described or illustrated herein. In particular examples, one or more computer systems 1000 provide functionality described or illustrated herein. In some examples, software running on one or more computer systems 1000 performs one or more steps of one or more methods described or illustrated herein or provides functionality described or illustrated herein. Other examples may include one or more portions of one or more computer systems 1000. Herein, reference to a computer system can encompass a computing device, and vice versa, where appropriate. Moreover, reference to a computer system can encompass one or more computer systems, where appropriate.

This disclosure contemplates any suitable number of computer systems 1000. This disclosure contemplates computer system 1000 taking any suitable physical form. As example and not by way of limitation, computer system 1000 can be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1000 can include one or more computer systems 1000; be unitary or distributed; span multiple locations; span multiple machines; span multiple data centers; or reside in a cloud, which can include one or more cloud components in one or more networks. Where appropriate, one or more computer systems 1000 can perform without substantial spatial or temporal limitation one or more steps of one or more methods described or illustrated herein. As an example, and not by way of limitation, one or more computer systems 1000 can perform in real time or in batch mode one or more steps of one or more methods described or illustrated herein. One or more computer systems 1000 can perform at different times or at different locations one or more steps of one or more methods described or illustrated herein, where appropriate.

In examples, computer system 1000 includes a processor 1002, memory 1004, storage 1006, an input/output (I/O) interface 1008, a communication interface 1010, and a bus 1012. Although this disclosure describes and illustrates a particular computer system having a particular number of particular components in a particular arrangement, this disclosure contemplates any suitable computer system having any suitable number of any suitable components in any suitable arrangement.

In some examples, processor 1002 includes hardware for executing instructions, such as those making up a computer program. As an example and not by way of limitation, to execute instructions, processor 1002 can retrieve (or fetch) the instructions from an internal register, an internal cache, memory 1004, or storage 1006; decode and execute them; and then write one or more results to an internal register, an internal cache, memory 1004, or storage 1006. In particular examples, processor 1002 can include one or more internal caches for data, instructions, or addresses. This disclosure contemplates processor 1002 including any suitable number of any suitable internal caches, where appropriate. As an example and not by way of limitation, processor 1002 can include one or more instruction caches, one or more data caches, and one or more translation lookaside buffers (TLBs). Instructions in the instruction caches can be copies of instructions in memory 1004 or storage 1006, and the instruction caches can speed up retrieval of those instructions by processor 1002. Data in the data caches can be copies of data in memory 1004 or storage 1006 for instructions executing at processor 1002 to operate on; the results of previous instructions executed at processor 1002 for access by subsequent instructions executing at processor 1002 or for writing to memory 1004 or storage 1006; or other suitable data. The data caches can speed up read or write operations by processor 1002. The TLBs can speed up virtual-address translation for processor 1002. In particular examples, processor 1002 can include one or more internal registers for data, instructions, or addresses. This disclosure contemplates processor 1002 including any suitable number of any suitable internal registers, where appropriate. Where appropriate, processor 1002 can include one or more arithmetic logic units (ALUs); be a multi-core processor; or include one or more processors 1002. Although this disclosure describes and illustrates a particular processor, this disclosure contemplates any suitable processor.

In some examples, memory 1004 includes main memory for storing instructions for processor 1002 to execute or data for processor 1002 to operate on. As an example and not by way of limitation, computer system 1000 can load instructions from storage 1006 or another source (such as, for example, another computer system 1000) to memory 1004. Processor 1002 can then load the instructions from memory 1004 to an internal register or internal cache. To execute the instructions, processor 1002 can retrieve the instructions from the internal register or internal cache and decode them. During or after execution of the instructions, processor 1002 can write one or more results (which can be intermediate or final results) to the internal register or internal cache. Processor 1002 can then write one or more of those results to memory 1004. In particular examples, processor 1002 executes only instructions in one or more internal registers or internal caches or in memory 1004 (as opposed to storage 1006 or elsewhere) and operates only on data in one or more internal registers or internal caches or in memory 1004 (as opposed to storage 1006 or elsewhere). One or more memory buses (which can each include an address bus and a data bus) can couple processor 1002 to memory 1004. Bus 1012 can include one or more memory buses, as described below. In some examples, one or more memory management units (MMUs) reside between processor 1002 and memory 1004 and facilitate accesses to memory 1004 requested by processor 1002. In particular examples, memory 1004 includes random access memory (RAM). This RAM can be volatile memory, where appropriate. Where appropriate, this RAM can be dynamic RAM (DRAM) or static RAM (SRAM). Moreover, where appropriate, this RAM can be single-ported or multi-ported RAM. This disclosure contemplates any suitable RAM. Memory 1004 can include one or more memories 1004, where appropriate. Although this disclosure describes and illustrates particular memory, this disclosure contemplates any suitable memory.

In some examples, storage 1006 includes mass storage for data or instructions. As an example, and not by way of limitation, storage 1006 can include a hard disk drive (HDD), a floppy disk drive, flash memory, an optical disc, a magneto-optical disc, magnetic tape, or a Universal Serial Bus (USB) drive or a combination of two or more of these. Storage 1006 can include removable or non-removable (or fixed) media, where appropriate. Storage 1006 can be internal or external to computer system 1000, where appropriate. In some examples, storage 1006 is non-volatile, solid-state memory. In particular examples, storage 1006 includes read-only memory (ROM). Where appropriate, this ROM can be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1006 taking any suitable physical form. Storage 1006 can include one or more storage control units facilitating communication between processor 1002 and storage 1006, where appropriate. Where appropriate, storage 1006 can include one or more storages 1006. Although this disclosure describes and illustrates particular storage, this disclosure contemplates any suitable storage.

In some examples, I/O interface 1008 includes hardware, software, or both, providing one or more interfaces for communication between computer system 1000 and one or more I/O devices. Computer system 1000 can include one or more of these I/O devices, where appropriate. One or more of these I/O devices can enable communication between a person and computer system 1000. As an example and not by way of limitation, an I/O device can include a keyboard, keypad, microphone, monitor, mouse, printer, scanner, speaker, still camera, stylus, tablet, touch screen, trackball, video camera, another suitable I/O device or a combination of two or more of these. An I/O device can include one or more sensors. This disclosure contemplates any suitable I/O devices and any suitable I/O interfaces 1008 for them. Where appropriate, I/O interface 1008 can include one or more device or software drivers enabling processor 1002 to drive one or more of these I/O devices. I/O interface 1008 can include one or more I/O interfaces 1008, where appropriate. Although this disclosure describes and illustrates a particular I/O interface, this disclosure contemplates any suitable I/O interface.

In some examples, communication interface 1010 includes hardware, software, or both providing one or more interfaces for communication (such as, for example, packet-based communication) between computer system 1000 and one or more other computer systems 1000 or one or more networks. As an example and not by way of limitation, communication interface 1010 can include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1010 for it. As an example and not by way of limitation, computer system 1000 can communicate with an ad hoc network, a personal area network (PAN), a local area network (LAN), a wide area network (WAN), a metropolitan area network (MAN), or one or more portions of the Internet or a combination of two or more of these. One or more portions of one or more of these networks can be wired or wireless. As an example, computer system 1000 can communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1000 can include any suitable communication interface 1010 for any of these networks, where appropriate. Communication interface 1010 can include one or more communication interfaces 1010, where appropriate. Although this disclosure describes and illustrates a particular communication interface, this disclosure contemplates any suitable communication interface.

In particular examples, bus 1012 includes hardware, software, or both coupling components of computer system 1000 to each other. As an example and not by way of limitation, bus 1012 can include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1012 can include one or more buses 1012, where appropriate. Although this disclosure describes and illustrates a particular bus, this disclosure contemplates any suitable bus or interconnect.

Herein, a computer-readable non-transitory storage medium or media can include one or more semiconductor-based or other integrated circuits (ICS) (such, as for example, field-programmable gate arrays (FPGAs) or application-specific ICS (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium can be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the examples described or illustrated herein that a person having ordinary skill in the art would comprehend. The scope of this disclosure is not limited to the examples described or illustrated herein. Moreover, although this disclosure describes and illustrates respective examples herein as including particular components, elements, feature, functions, operations, or steps, any of these examples can include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular examples as providing particular advantages, particular examples can provide none, some, or all of these advantages.

ALTERNATIVE EMBODIMENTS

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of applications and symbolic representations of operations on information. These application descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments also may relate to an apparatus for performing the operations herein. This apparatus may be specially constructed for the required purposes, and/or it may comprise a computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments also may relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed:

1. A device comprising:
a display providing content in a viewable region of the display;
a camera device configured to track a scene of a real-world environment captured in a field of view of the camera device;
one or more processors and a non-transitory memory including computer-executable instructions, which when executed, cause the device to at least:
determine a first region of interest in the scene;
perform object recognition on the scene tracked by the camera device;
determine an environmental interaction based on the object recognition and the first region of interest;
associate a second region of interest with the environmental interaction;
associate a third region of interest with the content in the viewable region of the display; and
adaptively alter, based on the environmental interaction, a position of the content provided by the display, wherein adaptively altering the position of the content provided by the display includes continuously moving the position of the content to reduce interference between the third region of interest and the second region of interest.

2. The device of claim 1, wherein the environmental interaction comprises at least one of:
an approaching object;
an approaching person;
a departing object;
a departing person;
an interaction with one or more objects;
an interaction with one or more persons; or
a gesture.

3. The device of claim 1, wherein the instructions, when executed by the one or more processors, further cause the device to:
determine a transition of the first region of interest from the display to the scene, or a transition of the first region of interest from the scene to the display;
minimize or reduce a size of the content in an instance in which the first region of interest transitions from the display to the scene; and
maximize or increase the size of the content in an instance in which the first region of interest transitions from the scene to the display.

4. The device of claim 1, wherein the device comprises an augmented reality device.

5. The device of claim 4, wherein the augmented reality device comprises a head-mounted device.

6. The device of claim 1, further comprising a second camera device configured to track a gaze of at least one eye, wherein the second camera device comprises a left eye tracking camera and a right eye tracking camera.

7. The device of claim 1, wherein the camera device comprises at least one outward-facing camera to track the scene.

8. The device of claim 1, wherein the display provides holographic content comprising augmented reality content.

9. The device of claim 1, wherein the scene captured in the field of view is associated with a gaze of at least one eye tracked by a second camera device.

10. The device of claim 1, wherein the instructions, when executed by the one or more processors, further cause the device to:

determine the first region of interest by determining a gaze depth of at least one eye or a gaze direction of the at least one eye captured by a second camera device.

11. The device of claim 1, wherein the object recognition identifies a person or an object in the scene.

12. A method comprising:

performing object recognition on a scene of a real-world environment captured in a field of view of a camera device;

determining a first region of interest in the scene;

determining an environmental interaction based on the object recognition and the first region of interest;

associating a second region of interest with the environmental interaction;

associating a third region of interest with content in a viewable region of a display; and adaptively altering, based on the environmental interaction, a position of the content provided by the display, wherein adaptively altering the position of the content provided by the display includes continuously moving the position of the content to reduce interference between the third region of interest and the second region of interest.

13. The method of claim 12, further comprising:

determining the first region of interest based on a gaze of at least one eye tracked by a second camera device;

determining, based on the gaze, a transition of the first region of interest between the display and the scene;

minimizing or reducing a size of the content in an instance in which the first region of interest transitions from the display to the scene; and maximizing or increasing the size of the content in an instance in which the first region of interest transitions from the scene to the display.

14. The method of claim 12, further comprising:

applying one or more machine learning techniques to determine the environmental interaction based on training data associating one or more tracked gazes with one or more scenes.

15. The method of claim 12, further comprising:

performing, by a device, the adaptively altering the position of the content.

16. A non-transitory, tangible computer-readable medium storing instructions that, when executed, cause:

performing object recognition on a scene tracked by a camera device;

determining a first region of interest in the scene;

determining an environmental interaction based on the object recognition and the first region of interest;

associating a second region of interest with the environmental interaction;

associating a third region of interest with content in a viewable region of a display; and adaptively altering, based on the environmental interaction, a position of the content provided on the display, wherein adaptively altering the position of the content provided by the display includes continuously moving the position of the content to reduce interference between the third region of interest and the second region of interest.

17. The computer-readable medium of claim 16, wherein the object recognition is performed continuously in real-time.

18. The computer-readable medium of claim 16, wherein the instructions, when executed, further cause: determining a region of interest corresponding to a gaze of at least one eye tracked by a second camera device, wherein the region of interest is based on a gaze depth of the at least one eye or a gaze direction of the at least one eye.

19. The computer-readable medium of claim 16, wherein the instructions, when executed, further cause:

moving, reducing, or minimizing the position of the content from the display in an instance in which an object of interest approaches at a predetermined threshold speed.

* * * * *